United States Patent [19]

Gallup et al.

[11] Patent Number: 4,909,447

[45] Date of Patent: Mar. 20, 1990

[54] GASOLINE INJECTOR

[75] Inventors: David R. Gallup, Travelers Rest, S.C.; John H. Kenning, Sutton Coldfield, England

[73] Assignee: Lucas Industries Public Limited Company, Birmingham, United Kingdom

[21] Appl. No.: 258,421

[22] Filed: Oct. 17, 1988

[30] Foreign Application Priority Data

Oct. 27, 1987 [GB] United Kingdom ................ 8725176

[51] Int. Cl.[4] ........................................ F16K 31/06

[52] U.S. Cl. ........................... 239/585; 251/129.16

[58] Field of Search .................. 239/585; 251/129.16

[56] References Cited

U.S. PATENT DOCUMENTS

| | | | |
|---|---|---|---|
| 4,356,980 | 11/1982 | Krauss | 239/585 |
| 4,390,130 | 6/1983 | Linssen et al. | 239/585 |
| 4,676,478 | 6/1987 | Kiuchi | 239/585 |
| 4,717,118 | 1/1988 | Potter | 251/129.16 |
| 4,795,098 | 1/1989 | Kirchner et al. | 239/585 |

FOREIGN PATENT DOCUMENTS

| | | | |
|---|---|---|---|
| 2147949 | 5/1985 | United Kingdom | 239/585 |

*Primary Examiner*—Andres Kashnikow
*Assistant Examiner*—Michael J. Forman
*Attorney, Agent, or Firm*—Fleit, Jacobson, Cohn, Price, Holman & Stern

[57] ABSTRACT

A gasoline fuel injector wherein the valve member is in the form of a plate which is attracted towards a pair of pole faces when a winding is energized and the extent of movement of the valve member is limited by a non-magnetic spacer member which is of annular form. In order to reduce the possibility of the valve member sticking to the spacer member the contact area between the valve member and spacer member is minimized by the provision of radially inwardly extending circumferentially spaced tongues engageable by the valve member in the open position.

2 Claims, 2 Drawing Sheets

GASOLINE INJECTOR

BACKGROUND OF THE INVENTION

This invention relates to a gasoline injector for supplying fuel to an air inlet of a spark ignition engine, the injector being of the type comprising a central hollow magnetic core member having one end connected in use to a source of fuel, a hollow body formed from magnetic material and surrounding the core member in spaced relationship, the body defining an annular pole face which extends inwardly towards the other end of the core member, the end face of the core member defining a further pole face, a winding which in use can be energized to cause the pole faces to assume opposite magnetic polarity, a seat member spaced from said pole faces, the seat member defining an outlet orifice, a plate-like valve member formed from magnetic material located with clearance between the seat member and the pole faces and resilient means acting on said valve member to urge the valve member into contact with the seat member, the valve member being lifted from the seat member by magnetic forces when the winding is energized, to allow fuel flow through the outlet orifice.

An injector of the aforesaid type is known from British Pat. No. 2147949B in which a non-magnetic spacer is provided which is positioned to prevent metal-to-metal contact of the valve member and the pole face defined by the body thereby minimizing the risk of the valve member sticking to the pole face due to residual magnetism. While sticking due to magnetic effects is prevented by the spacer the valve member does tend to adhere to the spacer due to the fact that the spacer and valve member are wetted by the gasolene thereby slowing the closure of the valve member. If a stronger spring is provided to return the valve member more quickly into contact with the seat member, the magnetic force required to lift the valve member away from the seat member will be increased and as a result the power consumption of the injector will be increased.

BRIEF SUMMARY OF THE INVENTION

The object of the present invention is to provide an injector of the aforesaid type in a simple and convenient form.

According to the invention an injector of the type specified comprises a non-magnetic spacer member positioned adjacent the annular pole face, said spacer member acting to prevent metal-to-metal contact between the pole face and the valve member and being of annular form and defining a plurality of inwardly extending circumferentially spaced tongues, whereby the contact area between the spacer member and the valve member is reduced.

BRIEF DESCRIPTION OF THE DRAWINGS

An example of a gasolene injector in accordance with the invention will now be described with reference to the accompanying drawings wherein.

DETAILED DESCRIPTION

Figure 1:
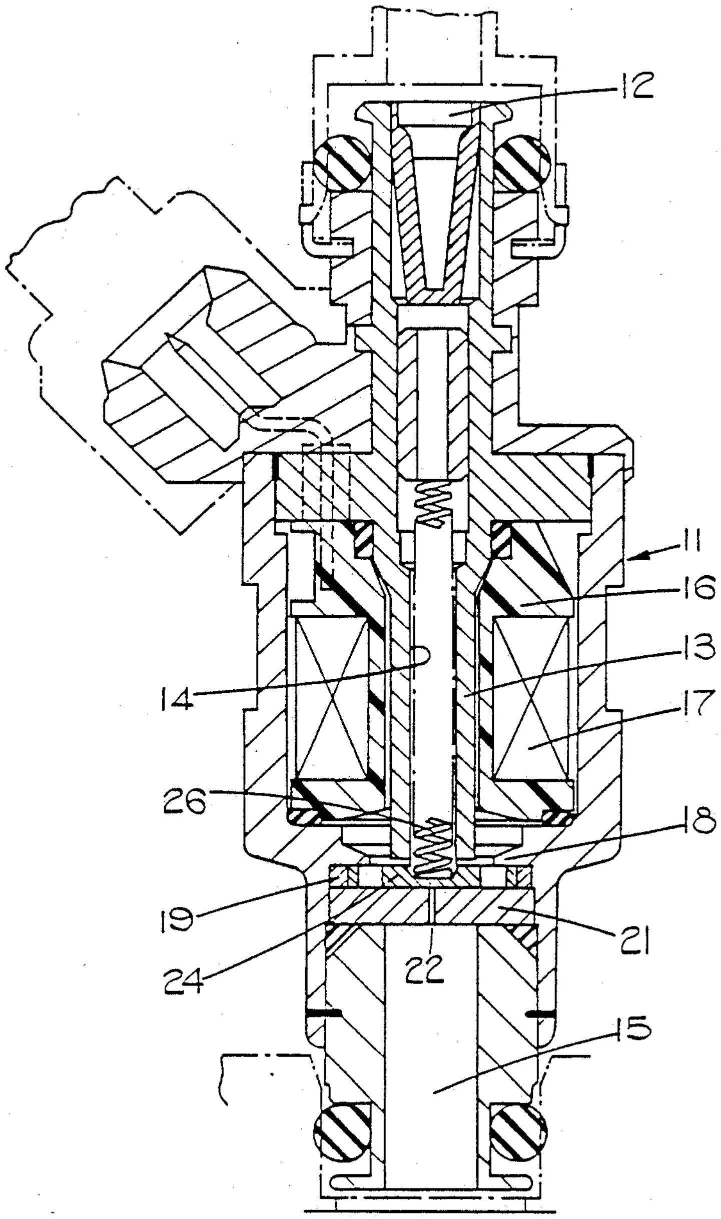
FIG. 1 is a longitudinal sectional view of the injector.
Figure 2:
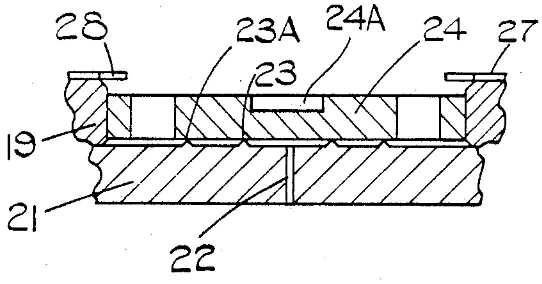
FIG. 2 is a an enlarged detail of a portion of the injector seen in FIG. 1.

Referring to FIG. 1 of the drawings, the injector comprises a hollow generally cylindrical outer body 11 formed from magnetic material within which there extends a hollow flanged core member 13 through which extends a passage 14 which connects an inlet 12 with an outlet 15 of the body. Surrounding the core 13 within the body is a former 16 which is formed from synthetic resin material and upon which is wound a solenoid winding 17. The outlet which is in the form of a sleeve retained within the body, projects in use into an air inlet of the engine.

Adjacent the outlet 15 the body 11 defines an integral radially inwardly extending circumferential shoulder 18 against which a steel annulus, or annular cross-section member, 19 is trapped by a steel disc-like seat member 21 in which is formed an outlet orifice 22. The orifice extends from the surface of the valve seat member remote from the outlet and surrounding the outlet are a pair of annular seat elements 23, 23A.

Located within the annular member 19 is a valve member 24 of plate-like form which is formed from magnetic material and the face of the valve member presented to the end of the core member 13 is provided with a depression 24A in which is located one end of a coiled compression spring 26 which is housed within the passage 14.

The internal diameter of the shoulder 18 is less than the diameter of the annular member 19 and it therefore overlies the outer peripheral portion of the valve member 24. The faces of the core member 13 and the shoulder 18 which are presented to the valve member define pole faces which when the winding 17 is energized, assume opposite magnetic polarity and therefore attract the valve member towards the shoulder 18 and away from the seat member 21. The thickness of the valve member is less than the thickness of the annular member 19 by a predetermined amount to allow movement of the valve member and the movement of the valve member is arrested by a non-magnetic spacer member 27 which is positioned between the annular member 19 and the shoulder 18. When the valve member is lifted from the seat elements, fuel can flow through openings in the valve member and then through the outlet orifice 22.

Figure 3:
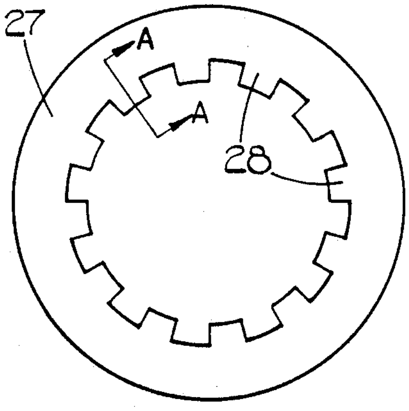
FIG. 3 is plan view of a component of the injector seen in FIG. 2.

The spacer member is formed from non-magnetic material such for example as non-magnetic stainless steel and a plan view of the spacer 27 is seen in FIG. 3.

Figure 4:
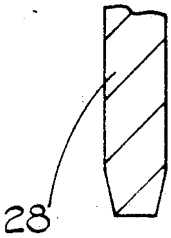
FIG. 4 is a cross-sectional view taken on the line A—A of FIG. 3.

As will be seen from FIG. 3 the spacer member is of annular form and its inner peripheral surface is castellated to form a plurality of radially inwardly extending tongues 28 which form the portions of the spacer which are contacted by the valve member 24. The cutaway portions of the spacer reduce the contact area between the valve member and the spacer and thereby reduce the tendency of the valve member to stick to the spacer when the solenoid 17 is de-energized. In FIG. 4 it will be seen that the inner end portions of the tongues 28 are tapered. This is because the spacer is produced using a chemical etching process. It will be understood that the periphery of the valve member 24 engages the tongues outwardly of said inner end portions so that the fully open position of the valve member is accurately defined.

By incorporating a spacer as described above it has been found that the tendency for the valve member to stick to the spacer is substantially reduced. Furthermore, the fact that the spacer is formed from non-magnetic stainless steel means that it will not acquire any residual magnetism during the course of use of the injector and it has been found that it cannot be contaminated by the constituents of the fuel which is supplied through the injector.

We claim:

1. A gasoline injector for supplying fuel to an air inlet of a spark ignition engine, comprising a central hollow magnetic core member having one end connected in use to a source of fuel, a hollow body formed from magnetic material and surrounding the core member in spaced relationship, an annular pole face on the hollow body, an end face on said core member defining a further pole face, a winding energizable to cause said pole faces to assume magnetic polarity, a seat member spaced from said pole faces, said seat member defining an outlet orifice, an annular member disposed between said seat member and said annular pole face, a plate shaped valve member formed from magnetic material engageable with said seat member and slidable in said annular member and having a size to provide clearance between said valve member and said pole faces when said valve member is in engagement with said seat member, resilient means acting on said valve member to urge said valve member into contact with said seat member to close said outlet orifice, said valve member when said winding is energized being lifted from said seat member by magnetic forces to open said outlet orifice and allow fuel flow through said outlet orifice, and a non- magnetic spacer member positioned adjacent said annular pole face to prevent direct contact between said annular pole face and said valve member, said spacer member having an annular form and a plurality of radially inwardly extending circumferentially spaced tongues engageable by said valve member when said winding is energized, so that the contact area between said spacer member and said valve member is minimized.

2. An injector as claimed in claim 1 wherein:

said spacer member if formed from stainless steel; and said tongues are produced by chemical etching and the radially inner end portions thereof are tapered to reduce the thickness of said end portions.

* * * * *